(12) United States Patent
Hirooka et al.

(10) Patent No.: US 9,562,486 B2
(45) Date of Patent: Feb. 7, 2017

(54) CONTROL DEVICE FOR INTERNAL COMBUSTION ENGINE

(71) Applicant: Toyota Jidosha Kabushiki Kaisha, Toyota-shi, Aichi-ken (JP)

(72) Inventors: Shigemasa Hirooka, Susono (JP); Takahiko Fujiwara, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/886,564

(22) Filed: Oct. 19, 2015

(65) Prior Publication Data
US 2016/0115886 A1 Apr. 28, 2016

(30) Foreign Application Priority Data
Oct. 24, 2014 (JP) .................................. 2014-217308
Apr. 3, 2015 (JP) .................................. 2015-076708

(51) Int. Cl.
*F01N 3/00* (2006.01)
*F02D 41/02* (2006.01)
*F02D 41/14* (2006.01)
*F01N 3/10* (2006.01)

(52) U.S. Cl.
CPC .......... *F02D 41/024* (2013.01); *F02D 41/1454* (2013.01); *F01N 3/101* (2013.01); *F01N 2430/06* (2013.01); *F02D 41/1475* (2013.01); *F02D 2200/0802* (2013.01)

(58) Field of Classification Search
CPC ...... F02D 41/024; F01N 3/101; F01N 3/2006; F01N 2430/06

USPC .................................................. 60/272–324
See application file for complete search history.

(56) References Cited

U.S. PATENT DOCUMENTS 5,996,337 A * 12/1999 Blosser ............... F02D 41/0055
60/274
6,189,316 B1 * 2/2001 Surnilla ............... F01N 3/0842
123/443

FOREIGN PATENT DOCUMENTS

JP 2004-211676 A 7/2004

* cited by examiner

*Primary Examiner* — Thomas Denion
*Assistant Examiner* — Kelsey Stanek
(74) *Attorney, Agent, or Firm* — Dinsmore & Shohl LLP

(57) ABSTRACT

A control device for an internal combustion engine in which an exhaust purification device is provided the control device controls the air-fuel ratio of exhaust gas flowing into an exhaust purification device when the temperature of a three-way catalyst belongs to a temperature range in which it is not less than an activation onset temperature and is less than an activation complete temperature. The control device controls the air-fuel ratio of exhaust gas flowing into the exhaust purification device to a first air-fuel ratio which is lower than or equal to a theoretical air-fuel ratio when the temperature of the three-way catalyst belongs to a low-side temperature region, and controls the air-fuel ratio of exhaust gas flowing into the exhaust purification device to a second air-fuel ratio which is higher than the theoretical air-fuel ratio when the temperature of the three-way catalyst belongs to a high-side temperature region.

2 Claims, 4 Drawing Sheets

CONTROL DEVICE FOR INTERNAL COMBUSTION ENGINE

BACKGROUND OF THE INVENTION

Field of the Invention

The present invention relates to a technique for controlling an air-fuel ratio of an internal combustion engine in which an exhaust purification device containing a three-way catalyst is arranged on an exhaust passage.

Description of the Related Art

In recent years, exhaust purification devices are disposed on exhaust passages of internal combustion engines for the purpose of purifying nitrogen oxides ($NO_X$) contained in exhaust gases of the internal combustion engines. However, in some cases, nitrous oxides ($N_2O$) may be generated in the course of purifying $NO_X$ with the exhaust purification devices.

As one method for restraining generation of $N_2O$, proposed is a method that, in a configuration in which an exhaust purification device contains $NO_X$ storage reduction (NSR) catalyst, reduces the amount $N_2O$ to be generated at the NSR catalyst by raising the temperature of the NSR catalyst or decreasing the concentration of oxygen in exhaust gas once the amount of $N_2O$ flowing out of the exhaust purification device measures a predetermined amount or more (Japanese Patent Application Laid-Open No. 2004-211676, for example).

SUMMARY OF THE INVENTION

Meanwhile, in a configuration in which an exhaust purification device is provided with a three-way catalyst, $N_2O$ may possibly be generated at the three-way catalyst and flow out of the exhaust purification device when the temperature of the three-way catalyst is in a temperature range in which it is not less than a temperature at which the purification performance of the three-way catalyst starts to activate (activation onset temperature) and is less than a temperature at which the purification performance of the three-way catalyst reaches a desired level or above (activation complete temperature).

The present invention is proposed in the light of these actual situations, and its purpose is to, in a control device for an internal combustion engine in which an exhaust purification device containing a three-way catalyst is arranged on an exhaust passage, decrease the concentration of $N_2O$ in exhaust gas flowing out of the exhaust purification device when the temperature of the three-way catalyst is in a temperature range in which it is not less than an activation onset temperature and is less than an activation complete temperature.

In order to solve the above-mentioned problems, it is proposed in the present invention to, in a control device for an internal combustion engine in which an exhaust purification device containing a three-way catalyst is arranged on an exhaust passage, decrease the concentration of $N_2O$ in exhaust gas (amount of $N_2O$ contained in per unit amount of exhaust gas) flowing out of the exhaust purification device by controlling the air-fuel ratio of exhaust gas flowing into the three-way catalyst, based on a characteristic that, when the temperature of the three-way catalyst is in a temperature range in which it is not less than an activation onset temperature and is less than an activation complete temperature, a temperature region in which $N_2O$ may be generated at the three-way catalyst will change depending on the air-fuel ratio of exhaust gas flowing into the three-way catalyst.

Specifically, the present invention relates to a control device for an internal combustion engine in which an exhaust purification device containing a three-way catalyst is arranged on an exhaust passage, the control device comprising: a controller comprising at least one processor configured to: acquire the temperature of the three-way catalyst; and control the air-fuel ratio of exhaust gas flowing into the exhaust purification device when the temperature of the three-way catalyst belongs to a temperature range in which it is not less than a temperature at which the purification performance of the three-way catalyst starts to activate, i.e. activation onset temperature, and is less than a temperature at which the purification performance of the three-way catalyst reaches a desired level or above, i.e. activation complete temperature. The three-way catalyst has a characteristic that, within the above-mentioned temperature range, in a low-side temperature region in which it is more than the activation onset temperature and is less than a predetermined temperature lower than the activation complete temperature, the concentration of $N_2O$ in exhaust gas flowing out of the exhaust purification device becomes smaller in the case where the air-fuel ratio of exhaust gas flowing into the exhaust purification device is lower than or equal to a theoretical air-fuel ratio, as compared with the case where the air-fuel ratio is higher than the theoretical air-fuel ratio, and in a high-side temperature region in which it is not less than the predetermined temperature and is less than the activation complete temperature, the concentration of $N_2O$ in exhaust gas flowing out of the exhaust purification device becomes smaller in the case where the air-fuel ratio of exhaust gas flowing into the exhaust purification device is higher than the theoretical air-fuel ratio, as compared with the case where the air-fuel ratio is lower than or equal to the theoretical air-fuel ratio. And, the controller controls the air-fuel ratio of exhaust gas flowing into the exhaust purification device to a first air-fuel ratio which is lower than or equal to the theoretical air-fuel ratio when the temperature of the three-way catalyst belongs to the low-side temperature region, and controls the air-fuel ratio of exhaust gas flowing into the exhaust purification device to a second air-fuel ratio which is higher than the theoretical air-fuel ratio when the temperature of the three-way catalyst belongs to the high-side temperature region.

The term "activation onset temperature" as used herein refers to a temperature at which the purification efficiency of the three-way catalyst (conversion efficiency with respect to at least $NO_X$, among CO, HC, and $NO_X$) reaches a predetermined level greater than zero (20%, for example). Additionally, the term "activation complete temperature" as used herein refers to a temperature at which the purification efficiency of the three-way catalyst reaches a sufficiently high, desired level (greater than or equal to 80%, for example).

As a result of dedicated experiments and verifications, the inventors of the present application found out a characteristic that, within the temperature range in which it is not less than the activation onset temperature and is less than the activation complete temperature (hereinafter referred to as "warming-up temperature range"), in the low-side temperature region which is below the predetermined temperature, the amount of $N_2O$ to be generated at the three-way catalyst (concentration of $N_2O$ in exhaust gas flowing out of the exhaust purification device) becomes smaller in the case where the air-fuel ratio of exhaust gas flowing into the exhaust purification device is lower than or equal to the theoretical air-fuel ratio, as compared with the case where the air-fuel ratio is higher than the theoretical air-fuel ratio. Furthermore, the inventors of the present application also found out a characteristic that, in the high-side temperature region that is not less than the predetermined temperature within the warming-up temperature range, the amount of $N_2O$ to be generated at the three-way catalyst (concentration of $N_2O$ in exhaust gas flowing out of the exhaust purification device) becomes smaller in the case where the air-fuel ratio of exhaust gas flowing into the exhaust purification device is higher than the theoretical air-fuel ratio, as compared with the case where the air-fuel ratio is lower than or equal to the theoretical air-fuel ratio.

In the light of the above-mentioned characteristics, the concentration of $N_2O$ in exhaust gas flowing out of the exhaust purification device can be decreased when the three-way catalyst is in the warming-up temperature range in which it is not less than the activation onset temperature and is less than the activation complete temperature, by controlling the air-fuel ratio of exhaust gas flowing into the exhaust purification device to a first air-fuel ratio that is less than or equal to the theoretical air-fuel ratio when the temperature of the three-way catalyst is in the low-side temperature region and by controlling the air-fuel ratio of exhaust gas flowing into the exhaust purification device to a second air-fuel ratio that is higher than the theoretical air-fuel ratio when the temperature of the three-way catalyst is in the high-side temperature region.

Note that the first air-fuel ratio is such an air-fuel ratio that, the concentration of $N_2O$ in exhaust gas flowing out of the exhaust purification device becomes larger when the temperature of the three-way catalyst is in the high-side temperature region, as compared with when the temperature of the three-way catalyst is in the low-side temperature region, and such that, in the low-side temperature region, the concentration of $N_2O$ in exhaust gas flowing out of the exhaust purification device becomes smaller when the air-fuel ratio of exhaust gas flowing into the exhaust purification device is the first air-fuel ratio, as compared with when the air-fuel ratio is the second air-fuel ratio. And, the second air-fuel ratio is such an air-fuel ratio that, the concentration of $N_2O$ in exhaust gas flowing out of the exhaust purification device becomes larger when the temperature of the three-way catalyst is in the low-side temperature region, as compared with when the temperature of the three-way catalyst is in the high-side temperature region, and such that, in the high-side temperature region, the concentration of $N_2O$ in exhaust gas flowing out of the exhaust purification device becomes smaller when the air-fuel ratio of exhaust gas flowing into the exhaust purification device is the second air-fuel ratio, as compared with when the air-fuel ratio is the first air-fuel ratio.

With the first air-fuel ratio and the second air-fuel ratio set as above, it is possible to ensure that the generation of $N_2O$ at the three-way catalyst can be restrained when the three-way catalyst is in the warming-up temperature range. Accordingly, it is possible to more ensure that the concentration of $N_2O$ in exhaust gas flowing out of the exhaust purification device can be decreased in the warming-up temperature range.

Here, in the case where the temperature of the three-way catalyst belongs to the warming-up temperature range, the controller may determine that the temperature of the three-way catalyst belongs to the low-side temperature region if the temperature of the three-way catalyst is lower than a predetermined reference temperature and may determine that the temperature of the three-way catalyst belongs to the high-side temperature region if the temperature of the three-way catalyst is higher or equal to the reference temperature. That is, in the case where the temperature of the three-way catalyst belongs to the warming-up temperature range, the controller may control the air-fuel ratio of exhaust gas flowing into the exhaust purification device to the first air-fuel ratio if the temperature of the three-way catalyst is lower than the reference temperature and may control the air-fuel ratio of exhaust gas flowing into the exhaust purification device to the second air-fuel ratio if the temperature of the three-way catalyst is higher than or equal to the reference temperature. In this case, the reference temperature may be set equal to the predetermined temperature. That is, the reference temperature may be set to a predetermined temperature, i.e., a temperature at which the concentration of $N_2O$ in exhaust gas flowing out of the exhaust purification device when the air-fuel ratio of exhaust gas flowing into the exhaust purification device is the first air-fuel ratio is equal to the concentration of $N_2O$ in exhaust gas flowing out of the exhaust purification device when the air-fuel ratio of exhaust gas flowing into the exhaust purification device is the second air-fuel ratio.

By virtue of such a configuration, the amount of $N_2O$ to be generated at the three-way catalyst can be reduced to the extent possible when the three-way catalyst is in the warming-up temperature range. Note that the reference temperature may not necessarily be equal to the predetermined temperature, i.e., a temperature at which the concentration of $N_2O$ in exhaust gas flowing out of the exhaust purification device when the air-fuel ratio of exhaust gas is the first air-fuel ratio is equal to the concentration of $N_2O$ in exhaust gas flowing out of the exhaust purification device when the air-fuel ratio of exhaust gas is the second air-fuel ratio, and may be, for example, set to a temperature that is around the predetermined temperature and is effective in facilitating the warming-up of the three-way catalyst and in improving the combustion stability of the internal combustion engine.

According to the present invention, in a control device for an internal combustion engine in which an exhaust purification device containing a three-way catalyst is arranged on an exhaust passage, the amount of $N_2O$ in exhaust gas flowing out of the exhaust purification device can be reduced when the temperature of the three-way catalyst is in a temperature range in which it is not less than an activation onset temperature and is less than an activation complete temperature.

Further features of the present invention will become apparent from the following description of exemplary embodiments with reference to the attached drawings.

DESCRIPTION OF THE EMBODIMENTS

Specific embodiments of the present invention will be described below based on the drawings. Dimensions, materials, geometries, and relative arrangements of components described in these embodiments are not intended to limit the technical scope of the invention thereto, unless otherwise stated so.

Figure 1:
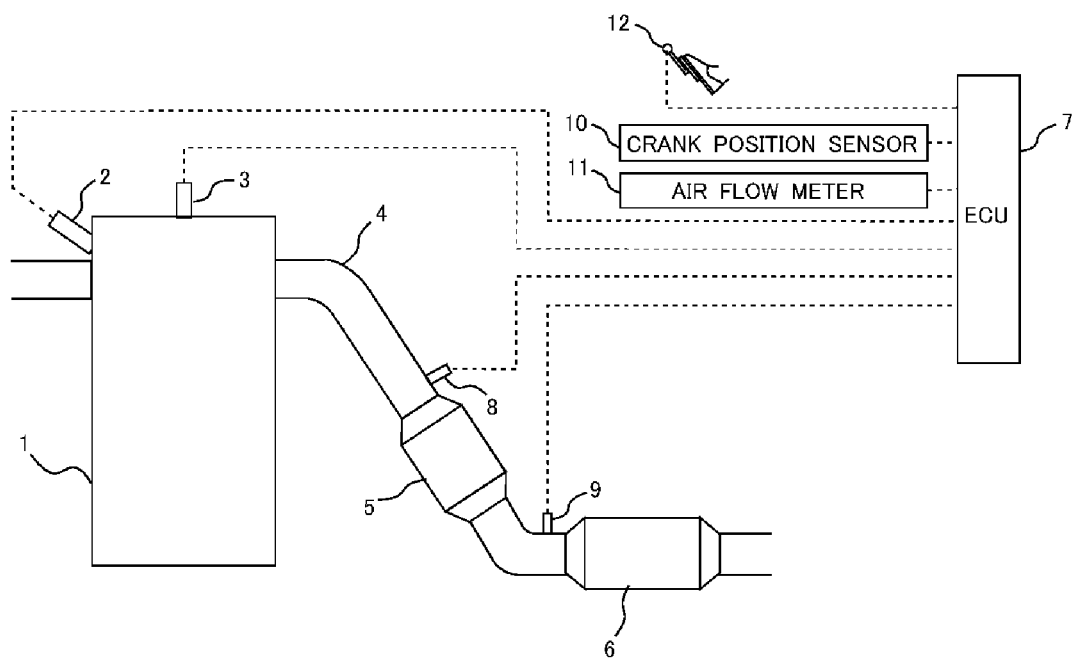
FIG. 1 is a diagram showing a general configuration of an internal combustion engine and its exhaust system, to which the present invention is applied.

FIG. 1 is a diagram showing a general configuration of an internal combustion engine and its exhaust system, to which the present invention is applied. An internal combustion engine 1 shown in FIG. 1 is a spark-ignition type internal combustion engine (e.g., gasoline engine). The internal combustion engine 1 is provided with a fuel injection valve 2 and an ignition plug 3. The fuel injection valve 2 may be a valve device for injecting fuel to an inlet passage (e.g., inlet port) or may be a valve device for injecting fuel into a cylinder. The ignition plug 3 is a device for generating a spark as fire source within the cylinder.

The internal combustion engine 1 is connected to an exhaust pipe 4. The exhaust pipe 4 is a passage for flowing gas (exhaust gas) that was combusted in the cylinder of the internal combustion engine 1. There is an exhaust gas purification device arranged along the exhaust pipe 4. The exhaust gas purification device is provided with a first catalyst casing 5 and a second catalyst casing 6. The first catalyst casing 5 contains a three-way catalyst that is composed of a honeycomb structural body coated with a coating layer of alumina or the like, and a noble metal (e.g., platinum (Pt), palladium (Pd), rhodium (Rh), or the like) supported on the coating layer.

The second catalyst casing 6 is arranged on the exhaust pipe 4 at a location downstream of the first catalyst casing 5. The second catalyst casing 6 contains a $NO_X$ storage reduction catalyst (NSR catalyst) that is composed of a honeycomb structural body coated with a coating layer of alumina or the like, a noble metal (e.g., platinum, palladium, rhodium, or the like) supported on the coating layer, and a $NO_X$ adsorbent (barium, lithium, or the like) supported on the coating layer. Note that the second catalyst casing 6 may alternatively contain a selective reduction catalyst (SCR catalyst) that is composed of a honeycomb structural body made of cordierite or Fe—Cr—Al heat-resistant steel, an alumina or zeolite coating layer covering the honeycomb structural body, and a noble metal (e.g., platinum, palladium, or the like) supported on the coating layer. The second catalyst casing 6 may alternatively contain a three-way catalyst as with the first catalyst casing 5.

An ECU 7 is provided along with the internal combustion engine 1 thus constructed. The ECU 7 is an electronic control unit containing CPU, ROM, RAM, back-up RAM, and the like. The ECU 7 is connected to various sensors such as air-fuel ratio sensor (A/F sensor) 8, exhaust gas temperature sensor 9, crank position sensor 10, air flow meter 11, accelerator position sensor 12, and the like.

The air-fuel ratio sensor 8 is arranged on the exhaust pipe 4 at a location upstream of the first catalyst casing 5, and outputs an electric signal that is correlated with the air-fuel ratio of exhaust gas flowing into the first catalyst casing 5. The exhaust gas temperature sensor 9 is attached to the exhaust pipe 4 at a location between the first catalyst casing 5 and the second catalyst casing 6, and outputs an electric signal that is correlated with the temperature of exhaust gas flowing out of the first catalyst casing 5. The crank position sensor 10 outputs an electric signal that is correlated with the rotational position of the output shaft (crank shaft) of the internal combustion engine 1. The air flow meter 11 outputs an electric signal that is correlated with the amount of intake air of the internal combustion engine 1. The accelerator position sensor 12 outputs an electric signal that is correlated with the operation amount of the accelerator pedal (accelerator opening).

The ECU 7 controls the operational state of the internal combustion engine 1 based on the output signals of the various sensors described above. For example, the ECU 7 calculates a target value of air-fuel ratio (target air-fuel ratio) of air-fuel mixture to be supplied to the internal combustion engine 1 (engine air-fuel ratio), based on the engine rotation speed calculated from the output signal of the crank position sensor 10, and the output signal of the accelerator position sensor 12 (accelerator opening). The ECU 7 also calculates a target fuel injection quantity of the fuel injection valve 2 (fuel injection period), based on the target air-fuel ratio and the output signal of the air flow meter 11 (intake air mass), and operates the fuel injection valve 2 according to the target fuel injection quantity. Furthermore, the ECU 7 calculates the operation timing of the ignition plug 3 (target ignition timing), based on the engine rotation speed calculated from the output signal of the crank position sensor 10, and the output signal of the accelerator position sensor 12 (accelerator opening), and operates the ignition plug 3 according to the target ignition timing.

In addition to the known controls as described above, the ECU 7 also execute a process of controlling the air-fuel ratio of exhaust gas flowing into the first catalyst casing 5 such that the concentration of $N_2O$ in exhaust gas flowing out of the first catalyst casing 5 is decreased when the purification performance of the three-way catalyst contained in the first catalyst casing 5 is not active enough, such as in the case where the internal combustion engine 1 has been cold started (hereinafter referred to as "$N_2O$ restraining process"). The method of executing the $N_2O$ restraining process is described below. Note that in the configuration shown in FIG. 1, since there is no device for supplying reducing agent such as fuel (e.g., reducing agent adding valve such as fuel adding valve) disposed on the exhaust pipe 4 upstream of the first catalyst casing 5, the air-fuel ratio of exhaust gas flowing into the three-way catalyst is controlled by regulating the engine air-fuel ratio. However, if there is any device for adding reducing agent such as fuel adding valve disposed on the exhaust pipe 4 upstream of the first catalyst casing 5, the air-fuel ratio of exhaust gas flowing into the three-way catalyst may be controlled by regulating the amount of reducing agent to be supplied from the fuel adding device.

In an effort to establish a method that is effective in restraining the amount of $N_2O$ to be generated, the inventors of the present application found out, as a result of dedicated experiments and verifications, a characteristic that when the temperature of a three-way catalyst belongs to a temperature range in which it is not less than an activation onset temperature and is less than an activation complete temperature (warming-up temperature range), a temperature region in which $N_2O$ is generated at the three-way catalyst will change depending on the air-fuel ratio of exhaust gas flowing into the three-way catalyst. This characteristic is now described based on FIG. 2.

Figure 2:
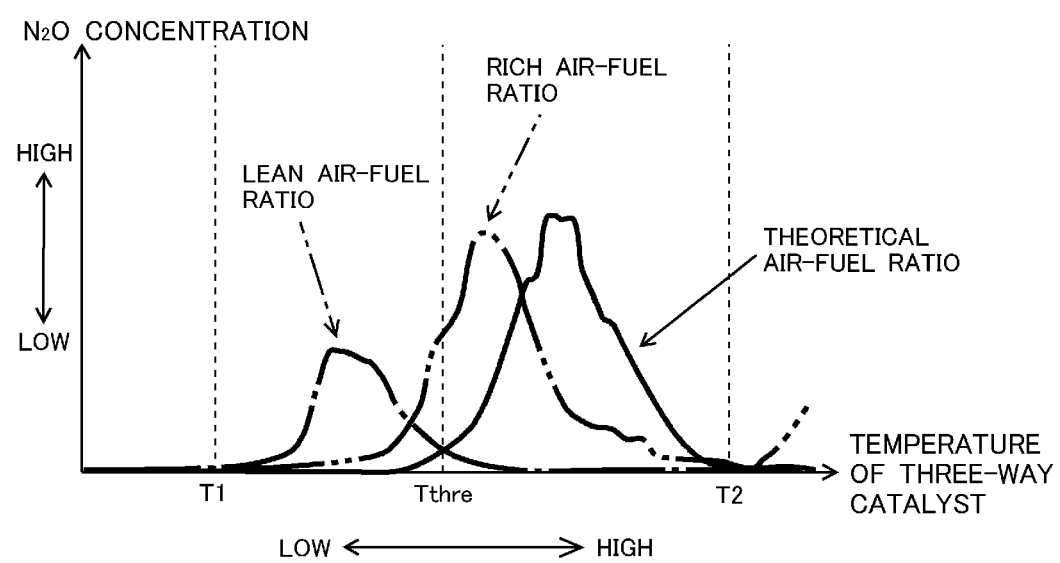
FIG. 2 is a diagram showing a correlation among the temperature of a three-way catalyst, the air-fuel ratio of exhaust gas flowing into a first catalyst casing, and the concentration of $N_2O$ in exhaust gas flowing out of the first catalyst casing, in the case where the temperature of the three-way catalyst is in a warming-up temperature range.

FIG. 2 is a diagram showing a correlation among the temperature of three-way catalyst, the air-fuel ratio of exhaust gas flowing into the first catalyst casing 5, and the concentration of $N_2O$ in exhaust gas flowing out of the first catalyst casing 5, in the case where a three-way catalyst having Pd and Rh supported therein is used. The solid line in FIG. 2 represents the concentration of $N_2O$ when the air-fuel ratio of exhaust gas is a theoretical air-fuel ratio (14.7, for example); the one-dot chain line in FIG. 2 represents the concentration of $N_2O$ when the air-fuel ratio of exhaust gas is a lean air-fuel ratio (15.3, for example) higher than the theoretical air-fuel ratio; and the two-dot chain line in FIG. 2 represents the concentration of $N_2O$ when the air-fuel ratio of exhaust gas is a weak-rich air-fuel ratio (14.4, for example) slightly lower than the theoretical air-fuel ratio. Note that the concentrations of $N_2O$ represented by these three lines indicate the concentrations of $N_2O$ for the case where conditions other than the air-fuel ratio of exhaust gas are identical. Furthermore, T1 in FIG. 2 represents an activation onset temperature, and T2 in FIG. 2 represents an activation complete temperature. The activation onset temperature is a temperature at which the purification performance of a three-way catalyst starts to activate, and is, for example, a temperature at which the purification efficiency (conversion efficiency) with respect to at least $NO_X$, among HC, CO, and $NO_X$ contained in exhaust gas, becomes greater than zero (for example, temperature at which the conversion efficiency becomes 20% or greater, which is approximately 300 degrees Celsius). The activation complete temperature is a temperature at which the purification performance of a three-way catalyst reaches a sufficiently high, desired level, and is, for example, a temperature at which the purification efficiency (conversion efficiency) with respect to at least $NO_X$, among HC, CO, and $NO_X$ contained in exhaust gas, reaches a sufficiently high, desired level (for example, temperature at which the conversion efficiency becomes 80% or greater, which is approximately 500 degrees Celsius).

As shown in FIG. 2, if the air-fuel ratio of exhaust gas is controlled to a lean air-fuel ratio when the temperature of the three-way catalyst belongs to the warming-up temperature range in which it is not less than the activation onset temperature T1 and is less than the activation complete temperature T2, the concentration of $N_2O$ shows a peak in the temperature region in which the temperature of the three-way catalyst is relatively low, and becomes approximately zero in the temperature region in which the temperature of the three-way catalyst is relatively high. In addition, if the air-fuel ratio of exhaust gas is controlled to be not higher than a theoretical air-fuel ratio when the temperature of the three-way catalyst belongs to the above-mentioned warming-up temperature range, then the concentration of $N_2O$ becomes lower in the temperature region in which the temperature of the three-way catalyst is relatively low, and shows a peak in the temperature region in which the temperature of the three-way catalyst is relatively high. In doing so, the lower the air-fuel ratio of exhaust gas is, the lower the temperature at which the concentration of $N_2O$ shows a peak shifts. However, once the air-fuel ratio of exhaust gas has been lowered to some extent, the temperature at which the concentration of $N_2O$ shows a peak does not shift lower any more. Note that the correlation as shown in FIG. 2 also applies to the case where the three-way catalyst has Pt supported therein.

Figure 3:
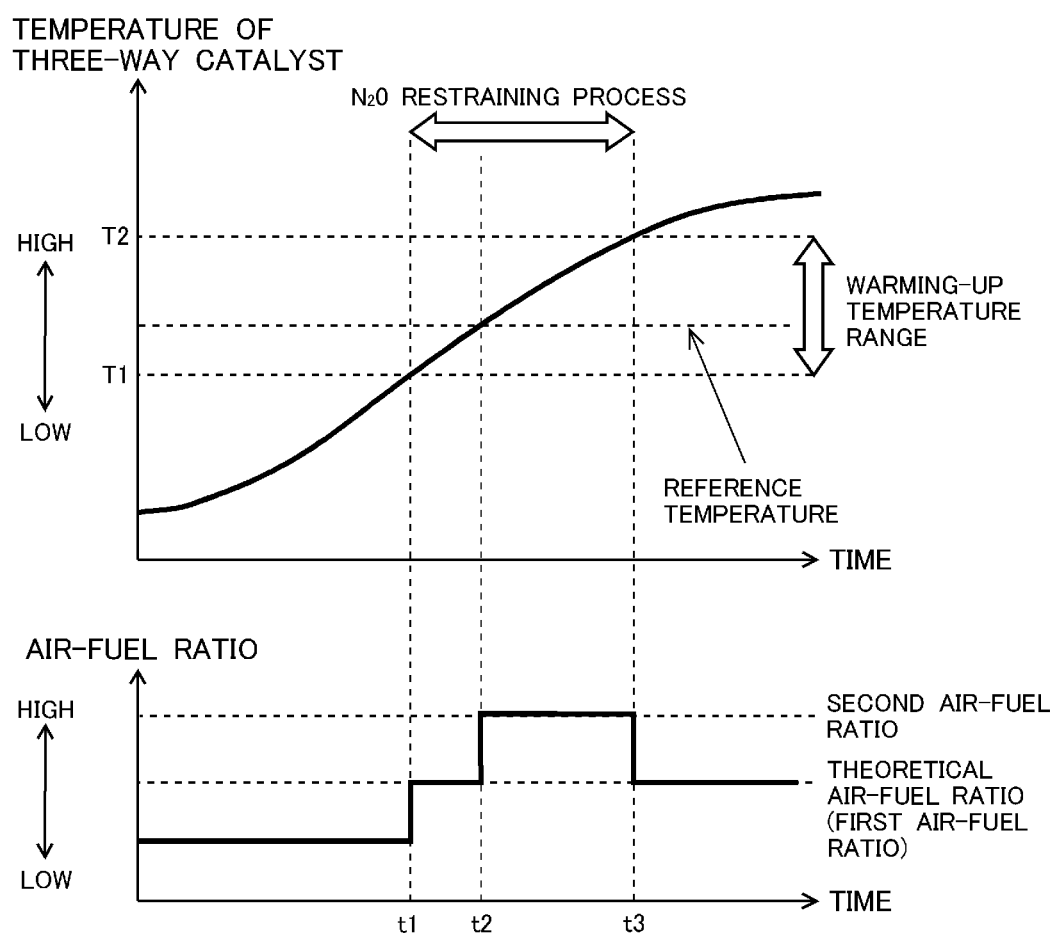
FIG. 3 is a timing chart showing a method of executing $N_2O$ restraining process.

Thus, in the present embodiment, the $N_2O$ restraining process is executed through the procedure as shown in FIG. 3 when the temperature of the three-way catalyst belongs to the warming-up temperature range. Specifically, once the temperature of the three-way catalyst rises to the activation onset temperature T1 or above in the course of rising from less than the activation onset temperature T1 to the activation complete temperature T2 or above (t1 in FIG. 3), the ECU 7 initiates the $N_2O$ restraining process. In doing so, when the temperature of the three-way catalyst is in the temperature region that is not less than the activation onset temperature T1 and less than a reference temperature (low-side temperature region), the ECU 7 controls the engine air-fuel ratio such that the air-fuel ratio of exhaust gas flowing into the three-way catalyst becomes the first air-fuel ratio that is equal to the theoretical air-fuel ratio. Subsequently, once the temperature of the three-way catalyst rises to the reference temperature or above (t2 in FIG. 3), the ECU 7 switches the engine air-fuel ratio from the first air-fuel ratio to the second air-fuel ratio that is higher than the theoretical air-fuel ratio, thereby switching the air-fuel ratio of exhaust gas flowing into the three-way catalyst from the first air-fuel ratio to the second air-fuel ratio. The process of controlling the engine air-fuel ratio to the second air-fuel ratio continues until the temperature of the three-way catalyst reaches the activation complete temperature T2 (t3 in FIG. 3). Then, once the temperature of the three-way catalyst rises to the activation complete temperature T2 or above (t3 in FIG. 3), the ECU 7 switches the engine air-fuel ratio from the second air-fuel ratio to an air-fuel ratio that is appropriate for the operational state of the internal combustion engine 1 (the theoretical air-fuel ratio in the example shown in FIG. 3), thereby terminates the $N_2O$ restraining process.

The term "reference temperature" as used herein refers to a temperature that is equal to the temperature in FIG. 2 described above, at which the concentration of $N_2O$ when the air-fuel ratio of exhaust gas is the first air-fuel ratio becomes equivalent to the concentration of $N_2O$ when the air-fuel ratio of exhaust gas is the second air-fuel ratio (Tthre in FIG. 2). This temperature Tthre corresponds to the "predetermined temperature" according to the present invention. Note that the reference temperature may alternatively be set to be different from the predetermined temperature Tthre, unless it differs significantly from the predetermined temperature Tthre at which the concentration of $N_2O$ when the air-fuel ratio of exhaust gas is the first air-fuel ratio becomes equivalent to the concentration of $N_2O$ when the air-fuel ratio of exhaust gas is the second air-fuel ratio. For example, the reference temperature may alternatively be set to a temperature that is around the predetermined temperature Tthre and is effective in facilitating the warming-up of the three-way catalyst and in improving the combustion stability of the internal combustion engine 1.

In addition, although the first air-fuel ratio is set to be equivalent to the theoretical air-fuel ratio in the example shown in FIG. 3, the first air-fuel ratio may alternatively be set to a weak-rich air-fuel ratio that is lower than the theoretical air-fuel ratio. In case that the first air-fuel ratio is set to the weak-rich air-fuel ratio, the amount of $N_2O$ to be generated at the three-way catalyst in the low-side temperature region may possibly be somewhat larger than in case that the first air-fuel ratio is set to be the theoretical air-fuel ratio. However, the rate of temperature rise can be made larger. Therefore, in the low-side temperature region, it may be possible to set the first air-fuel ratio to a weak-rich air-fuel ratio that is lower than the theoretical air-fuel ratio, as long as the concentration of $N_2O$ in exhaust gas flowing out of the first catalyst casing 5 can be kept smaller than some predetermined regulation value (regulation value defined by laws or the like, for example), so as to restrain the generation of $N_2O$ and facilitate the warming-up of the three-way catalyst.

By having the $N_2O$ restraining process executed with the method as shown in FIG. 3, the amount of $N_2O$ to be generated at the three-way catalyst can be reduced to the extent possible when the temperature of the three-way catalyst belongs to the warming-up temperature range in which it is not less than the activation onset temperature and is less than the activation complete temperature. As a result, the concentration of $N_2O$ in exhaust gas (amount of $N_2O$ contained in per unit amount of exhaust gas) flowing out of the first catalyst casing 5 can be decreased when the temperature of the three-way catalyst belongs to the warming-up temperature range.

Figure 4:
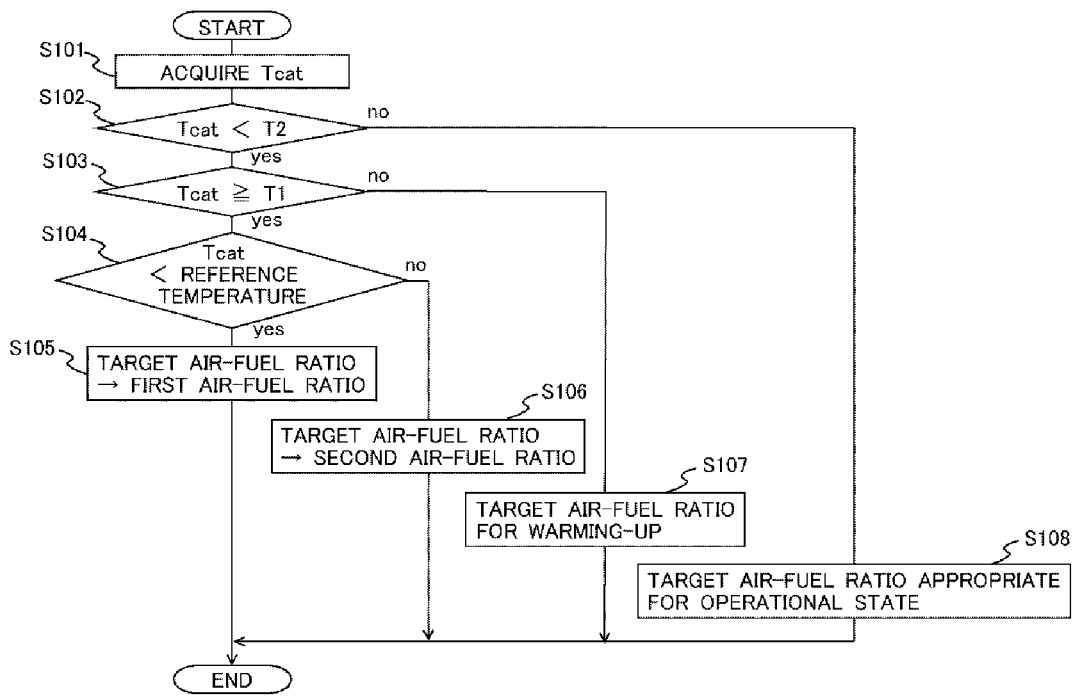
FIG. 4 is a flowchart showing a processing routine that is executed by an ECU in execution of the $N_2O$ restraining process.

The procedure for executing the $N_2O$ restraining process in the present embodiment is now described in connection with FIG. 4. FIG. 4 is a flowchart showing a processing routine that is executed by the ECU 7 in execution of the $N_2O$ restraining process. This processing routine is a processing routine that is executed by the ECU 7 in a repetitive manner during the operational period of the internal combustion engine 1, and is pre-stored in ROM of the ECU 7.

In the processing routine of FIG. 4, the ECU 7 first acquires the temperature of the three-way catalyst (Tcat in FIG. 4) in the processing of S101. The temperature of the three-way catalyst Tcat may be estimated from the operational history of the internal combustion engine 1, or may be estimated from the value measured by the exhaust gas temperature sensor 9. Note that in case that another exhaust gas temperature sensor is arranged on the exhaust pipe 4 at a location upstream of the first catalyst casing 5, the temperature of the three-way catalyst may also be estimated by using as a parameter the difference between the value measured by the above-mentioned exhaust gas temperature sensor and the value measured by the exhaust gas temperature sensor 9 that is arranged on the exhaust pipe 4 at a location downstream of the first catalyst casing 5.

In the processing of S102, the ECU 7 determines whether or not the temperature of the three-way catalyst Tcat acquired in the processing of the S101 is lower than an activation complete temperature (T2 in FIG. 4). The term "activation complete temperature T2" as used herein refers to a temperature, as with T2 in FIG. 2 described above, at which the purification efficiency with respect to at least $NO_X$, among HC, CO, and $NO_X$ contained in exhaust gas, reaches a desired level or above (temperature at which the conversion efficiency becomes 80% or greater, for example). In cases where a negative determination is made in the processing of S102 (Tcat≥T2), the ECU 7 proceeds to the processing of S108, and sets the target air-fuel ratio to an air-fuel ratio that is appropriate for the operational state of the internal combustion engine 1.

In cases where an affirmative determination is made in the processing of S102 (Tcat<T2), the ECU 7 proceeds to the processing of S103. In the processing of S103, it is determined whether or not the temperature of the three-way catalyst Tcat acquired in the processing of S101 is higher than or equal to an activation onset temperature (T1 in FIG. 4). The term "activation onset temperature" as used herein refers to a temperature, as with T1 in FIG. 2 described above, at which the purification efficiency (conversion efficiency) with respect to at least $NO_X$, among HC, CO, and $NO_X$ contained in exhaust gas, becomes larger than zero (temperature at which the conversion efficiency becomes 20% or greater, for example). In cases where a negative determination is made in the processing of S103 (Tcat<T1), the ECU 7 proceeds to the processing of S107, and sets the target air-fuel ratio to an air-fuel ratio that is effective in facilitating the warming-up of the three-way catalyst and in improving the combustion stability of the internal combustion engine 1 (air-fuel ratio for warming-up). The term "air-fuel ratio for warming-up" as used herein refers to a weak-rich air-fuel ratio that is lower than the theoretical air-fuel ratio, for example.

In cases where an affirmative determination is made in the processing of S103 (Tcat≥T1), then the temperature of the three-way catalyst Tcat belongs to the warming-up temperature range in which it is not less than the activation onset temperature T1 and is less than the activation complete temperature T2, so that the ECU 7 executes the $N_2O$ restraining process in the processing from S104 to S106.

First, in the processing of S104, the ECU 7 determines whether or not the temperature of the three-way catalyst Tcat acquired in the processing of S101 is lower than a reference temperature. The term "reference temperature" as used herein, as mentioned above in the description of FIG. 2, may be a temperature that is equal to the predetermined temperature, at which the concentration of $N_2O$ in exhaust gas flowing out of the first catalyst casing 5 when the air-fuel ratio of exhaust gas is the first air-fuel ratio becomes equivalent to the concentration of $N_2O$ in exhaust gas flowing out of the first catalyst casing 5 when the air-fuel ratio of exhaust gas is the second air-fuel ratio (Tthre in FIG. 2). The reference temperature may alternatively be set to a temperature that is around the predetermined temperature Tthre and is effective in facilitating the warming-up of the three-way catalyst and in improving the combustion stability of the internal combustion engine 1.

In cases where an affirmative determination is made in the processing of S104 (Tcat<reference temperature), then the temperature of the three-way catalyst Tcat can be considered to be in the low-side temperature region that is not less than the activation onset temperature T1 and less than the reference temperature. Therefore, the ECU 7 proceeds to the processing of S105, and sets the target value for the engine air-fuel ratio (target air-fuel ratio) to a first air-fuel ratio. The term "first air-fuel ratio" as used herein refers to an air-fuel ratio that is not higher than the theoretical air-fuel ratio, as mentioned above in the description of FIG. 3. If the engine air-fuel ratio is set to the first air-fuel ratio not higher than the theoretical air-fuel ratio when the temperature of the three-way catalyst Tcat is in the low-side temperature region, the air-fuel ratio of exhaust gas flowing into the first catalyst casing 5 becomes less than or equal to the theoretical air-fuel ratio. As a result, as mentioned above in the description of FIG. 2, the concentration of $N_2O$ in exhaust gas flowing out of the first catalyst casing 5 becomes smaller, as compared with the case where the air-fuel ratio of exhaust gas is a lean air-fuel ratio.

Also, in cases where a negative determination is made in the processing of S104 (Tcat≥reference temperature), then the temperature of the three-way catalyst Tcat can be considered to be in the high-side temperature region that is not less than the reference temperature and less than the activation complete temperature T2. Therefore, the ECU 7 proceeds to the processing of S106, and sets the target value for the engine air-fuel ratio (target air-fuel ratio) to a second air-fuel ratio. The term "second air-fuel ratio" as used herein refers to an air-fuel ratio that is higher than the theoretical air-fuel ratio, as mentioned above in the description of FIG. 3. If the engine air-fuel ratio is set to the second air-fuel ratio higher than the theoretical air-fuel ratio when the temperature of the three-way catalyst Tcat is in the high-side temperature region, the air-fuel ratio of exhaust gas flowing into the first catalyst casing 5 becomes higher than the theoretical air-fuel ratio. As a result, as mentioned above in the description of FIG. 2, the concentration of $N_2O$ in exhaust gas flowing out of the first catalyst casing 5 becomes smaller, as compared with the case where the air-fuel ratio of exhaust gas is less than or equal to the theoretical air-fuel ratio.

Note that the $N_2O$ restraining process that was initiated in the processing from S104 to S106 terminates once the temperature of the three-way catalyst rises to the activation complete temperature T2 or above (in cases where a negative determination is made in the processing of S102 in FIG. 4) in the course of executing the present processing routine in a repetitive manner.

Accordingly, the amount of $N_2O$ to be generated at the three-way catalyst can be reduced to the extent possible when the temperature of the three-way catalyst is in the warming-up temperature range in which it is not less than the activation onset temperature and is less than the activation complete temperature. Along with this, the concentration of $N_2O$ in exhaust gas flowing out of the first catalyst casing 5 can also be decreased to the extent possible when the temperature of the three-way catalyst is in the warming-up temperature range in which it is not less than the activation onset temperature and is less than the activation complete temperature.

Note that, although in the present embodiment, an example is described that executes the $N_2O$ restraining process throughout the warming-up temperature range in which it is not less than the activation onset temperature and is less than the activation complete temperature when the temperature of the three-way catalyst is in the warming-up temperature range, however, the $N_2O$ restraining process may alternatively be executed only in a part of the warming-up temperature range. For example, in a part of the warming-up temperature range, the $N_2O$ restraining process may be executed; whereas in the remaining part of the warming-up temperature range, a process for facilitating the warming-up of the three-way catalyst and for improving the combustion stability of the internal combustion engine 1 may be executed. In this case, the concentration of $N_2O$ in exhaust gas flowing out of the first catalyst casing 5 can be decreased in at least a part of the warming-up temperature range, while at the same time facilitating the warming-up of the three-way catalyst and improving the combustion stability of the internal combustion engine 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-076708, filed on Apr. 3, 2015, and No. 2014-217308, filed on Oct. 24, 2014 which are hereby incorporated by reference herein in its entirety.

What is claimed is:

1. A control device for an internal combustion engine in which an exhaust purification device containing a three-way catalyst is arranged on an exhaust passage,
the control device comprising:
a controller comprising at least one processor configured to:
acquire the temperature of the three-way catalyst; and
control the air-fuel ratio of exhaust gas flowing into the exhaust purification device by adjusting a fuel injection quantity from a fuel injection valve of the internal combustion engine when the temperature of the three-way catalyst belongs to a temperature range in which it is not less than an activation onset temperature, which is a temperature at which the purification performance of the three-way catalyst starts to activate, and is less than an activation complete temperature, which is a temperature at which the purification performance of the three-way catalyst reaches a desired level or above, wherein
the three-way catalyst has a characteristic that, within the temperature range, in a low-side temperature region in which it is more than the activation onset temperature and is less than a predetermined temperature lower than the activation complete temperature, the concentration of $N_2O$ in exhaust gas flowing out of the exhaust purification device becomes smaller in the case where the air-fuel ratio of exhaust gas flowing into the exhaust purification device is lower than or equal to a theoretical air-fuel ratio, as compared with the case where the air-fuel ratio is higher than the theoretical air-fuel ratio, and in a high-side temperature region in which it is not less than the predetermined temperature and is less than the activation complete temperature, the concentration of $N_2O$ in exhaust gas flowing out of the exhaust purification device becomes smaller in the case where the air-fuel ratio of exhaust gas flowing into the exhaust purification device is higher than the theoretical air-fuel ratio, as compared with the case where the air-fuel ratio is lower than or equal to the theoretical air-fuel ratio, and
the controller controls the air-fuel ratio of exhaust gas flowing into the exhaust purification device to a first air-fuel ratio which is lower than or equal to the theoretical air-fuel ratio by adjusting the fuel injection quantity from the fuel injection valve when the temperature of the three-way catalyst belongs to the low-side temperature region, and controls the air-fuel ratio of exhaust gas flowing into the exhaust purification device to a second air-fuel ratio which is higher than the theoretical air-fuel ratio by adjusting the fuel injection quantity from the fuel injection valve when the temperature of the three-way catalyst belongs to the high-side temperature region.

2. The control device for the internal combustion engine of claim 1, wherein
the predetermined temperature is a temperature at which the concentration of $N_2O$ in exhaust gas flowing out of the exhaust purification device when the air-fuel ratio of exhaust gas flowing into the exhaust purification device is the first air-fuel ratio becomes equivalent to the concentration of $N_2O$ in exhaust gas flowing out of exhaust purification device when the air-fuel ratio of exhaust gas flowing into the exhaust purification device is the second air-fuel ratio, and
in case that the temperature of the three-way catalyst belongs to the temperature range in which it is not less than the activation onset temperature and is less than the activation complete temperature, the controller controls the air-fuel ratio of exhaust gas flowing into the exhaust purification device to the first air-fuel ratio by adjusting the fuel injection quantity from the fuel injection valve if the temperature of the three-way catalyst is lower than a reference temperature which is equal to the predetermined temperature, and controls the air-fuel ratio of exhaust gas flowing into the exhaust purification device to the second air-fuel ratio by adjusting the fuel injection quantity from the fuel injection valve if the temperature of the three-way catalyst is higher than or equal to the reference temperature.

* * * * *